(12) United States Patent
Ono et al.

(10) Patent No.: US 9,776,387 B2
(45) Date of Patent: Oct. 3, 2017

(54) METHOD FOR PRODUCING TRANSPARENT ADHESIVE SHEET FOR OPTICAL APPLICATIONS, TRANSPARENT ADHESIVE SHEET FOR OPTICAL APPLICATIONS, AND DISPLAY DEVICE USING SAME

(71) Applicant: TAICA CORPORATION, Tokyo (JP)

(72) Inventors: Yosuke Ono, Tokyo (JP); Tatsuya Nunokawa, Tokyo (JP); Masanori Natsuka, Tokyo (JP); Hiroshi Mataki, Tokyo (JP)

(73) Assignee: TAICA CORPORATION, Tokyo (JP)

( * ) Notice: Subject to any disclaimer, the term of this patent is extended or adjusted under 35 U.S.C. 154(b) by 17 days.

(21) Appl. No.: 14/371,690

(22) PCT Filed: Jan. 7, 2013

(86) PCT No.: PCT/JP2013/050021
§ 371 (c)(1),
(2) Date: Jul. 10, 2014

(87) PCT Pub. No.: WO2013/105525
PCT Pub. Date: Jul. 18, 2013

(65) Prior Publication Data
US 2015/0002924 A1    Jan. 1, 2015

(30) Foreign Application Priority Data
Jan. 13, 2012    (JP) ................. 2012-005038

(51) Int. Cl.
*G06K 7/10*    (2006.01)
*B32B 38/00*    (2006.01)
(Continued)

(52) U.S. Cl.
CPC ........... *B32B 38/0008* (2013.01); *B32B 7/12* (2013.01); *B32B 27/08* (2013.01); *B32B 27/283* (2013.01);
(Continued)

(58) Field of Classification Search
CPC ......... C08L 83/00; C08L 83/14; C09J 183/04; C09J 175/02; C09J 183/10; C09J 2483/00;
(Continued)

(56) References Cited

U.S. PATENT DOCUMENTS

2001/0020515 A1    9/2001    Shibata et al.
2003/0152768 A1    8/2003    Melancon et al.
(Continued)

FOREIGN PATENT DOCUMENTS

JP    64-81827 A    3/1989
JP    7-173448 A    7/1995
(Continued)

OTHER PUBLICATIONS

Owen, "Plasma/Corona Treatment of Silicones", Australian Journal of Chemistry, vol. 58, 2005, pp. 433-436.
(Continued)

*Primary Examiner* — Bumsuk Won
*Assistant Examiner* — Balram Parbadia
(74) *Attorney, Agent, or Firm* — Westerman, Hattori, Daniels & Adrian, LLP

(57) ABSTRACT

A transparent adhesive sheet for optics, which is capable of satisfying both adhesion and rework property, in view of the above problems of prior art. A production method of a silicone-based transparent adhesive sheet for optics for assembling the optical components, includes a step of forming a surface activation treated surface, in which peel strength after laminating onto an adherend increases with
(Continued)

time, as compared with peel strength before lamination. The surface activation treatment is performed by using UV-ray irradiation on at least a part or the entire surface of an adhesive face contacting with the adherend of said transparent adhesive sheet for optics.

10 Claims, 6 Drawing Sheets

(51) Int. Cl.
    *C09J 7/00*     (2006.01)
    *C09J 183/00*     (2006.01)
    *C09J 7/02*     (2006.01)
    *G02B 1/10*     (2015.01)
    *B32B 7/12*     (2006.01)
    *B32B 27/08*     (2006.01)
    *B32B 27/28*     (2006.01)
    *B32B 37/24*     (2006.01)
    *B32B 37/12*     (2006.01)
    *B32B 39/00*     (2006.01)

(52) U.S. Cl.
CPC ............... *B32B 37/24* (2013.01); *C09J 7/00* (2013.01); *C09J 7/026* (2013.01); *C09J 183/00* (2013.01); *G02B 1/105* (2013.01); *B32B 37/12* (2013.01); *B32B 38/0004* (2013.01); *B32B 39/00* (2013.01); *B32B 2307/412* (2013.01); *B32B 2307/42* (2013.01); *B32B 2307/536* (2013.01); *B32B 2307/748* (2013.01); *B32B 2310/0831* (2013.01); *B32B 2551/00* (2013.01); *C09J 2203/318* (2013.01); *C09J 2205/31* (2013.01); *C09J 2483/00* (2013.01); *Y10T 428/2809* (2015.01)

(58) Field of Classification Search
CPC ...... C09J 7/00; C09J 7/0207; C09J 2201/134; C09J 183/00; C09J 2203/30; C09J 2203/318; C09J 2205/31; B32B 15/08; B32B 37/06; B32B 37/08; B32B 37/1284; B32B 37/26; B32B 38/0012; B32B 2310/0831; B32B 2037/1253; B32B 2037/268; C08J 5/12; C08J 2207/02; G02F 2202/28; Y10T 428/28; Y10T 428/2852; Y10T 428/31663; Y10T 428/26; Y10T 428/2809; Y10T 428/2817; A61L 15/58; G02B 1/105; G06K 7/10

See application file for complete search history.

(56) References Cited

U.S. PATENT DOCUMENTS

| | | | |
|---|---|---|---|
| 2006/0052523 A1* | 3/2006 | Bushendorf | B32B 7/12 524/589 |
| 2006/0115646 A1 | 6/2006 | Fujiwara et al. | |
| 2008/0187693 A1* | 8/2008 | Nielsen | C08J 7/047 428/34.1 |
| 2010/0178496 A1 | 7/2010 | Masuda et al. | |
| 2010/0215882 A1* | 8/2010 | Yanagi | C09J 5/00 428/41.3 |
| 2010/0323145 A1 | 12/2010 | Aoki | |
| 2011/0151249 A1* | 6/2011 | Yamanaka | B32B 27/308 428/351 |
| 2011/0171480 A1 | 7/2011 | Mori et al. | |
| 2013/0199830 A1* | 8/2013 | Morita | C08L 63/00 174/258 |

FOREIGN PATENT DOCUMENTS

| | | |
|---|---|---|
| JP | 2001-240820 A | 9/2001 |
| JP | 2001-323247 A | 11/2001 |
| JP | 2005-513196 A | 5/2005 |
| JP | 2005-200606 A | 7/2005 |
| JP | 2005-240016 A | 9/2005 |
| JP | 2007-98302 A | 4/2007 |
| JP | 2009-86452 A | 4/2009 |
| JP | 4500888 B2 | 7/2010 |
| JP | 2011-256286 A | 12/2011 |
| TW | 200900481 A | 1/2009 |
| TW | 201120175 A1 | 6/2011 |
| WO | 2010/032728 A1 | 3/2010 |
| WO | 2010/056541 A1 | 5/2010 |

OTHER PUBLICATIONS

International Search Report dated Apr. 9, 2013 issued in corresponding application No. PCT/JP2013/050021.

Extended European Search Report dated Jan. 22, 2016, issued in counterpart European Patent Application No. 13735971.7. (7 pages).

Office Action dated Jan. 19, 2016, issued in counterpart Taiwanese Patent Application No. 102100831, with English translation. (12 pages).

* cited by examiner (a)

(b)

(c)

(d)

(a)

(b)

(c)

METHOD FOR PRODUCING TRANSPARENT ADHESIVE SHEET FOR OPTICAL APPLICATIONS, TRANSPARENT ADHESIVE SHEET FOR OPTICAL APPLICATIONS, AND DISPLAY DEVICE USING SAME

TECHNICAL FIELD

The present invention relates to a production method of transparent adhesive sheet for optics, a transparent adhesive sheet for optics and a display apparatus using the same, and in more detail, the present invention relates to the production method of the transparent adhesive sheet for optics satisfying both adhesion and rework property, the transparent adhesive sheet for optics and the display apparatus using the same.

BACKGROUND ART

Conventionally, a functional adhesive sheet has been applied to an assembly of various kinds of optical equipments, electric equipments or electronic equipments (including parts). Among them, in view of productivity, adhesive sheets adaptable to rework (that is, re-lamination work by peeling from an adherend (a liquid crystal display apparatus or a protection panel or the like) for repairing or the like, and it may also be referred to as repair) of a lamination article have been required, in particular, in lamination with a liquid crystal display apparatus having high price parts (hereafter it may also be referred to as LCD), adhesive sheets adaptable to rework have been required strongly.

On the other hand, securing of adhesion with the adherend has also been required, however, because adhesion and rework property are conflicting characteristics, satisfaction of both has been difficult.

In addition, in recent years, in view of practical reliability of the assembly parts where a functional adhesive sheet and the adherend are laminated, the functional adhesive sheets having higher adhesion (tackiness) have been required, wherein (1) securing of high adhesion enough to clear a point pressurization test, to confirm generation of peeling of the functional adhesive sheets or air bubbles, by adding point load, using a pressurization element, from the surface of the assembly product (for example, a laminated body of LCD/the functional adhesive sheets/a protection panel), on the other hand, results in significant decrease in (2) securing of workability by maintaining light peeling property of a releasing protection sheet present at the surface of the functional adhesive sheets in the assembly, and (3) adhesion gap or rework property in repair or exchange of parts. Accordingly, satisfaction of both adhesion and rework property has been still more difficult.

Under the above situation, various proposals have been made conventionally, as technology for improving or solving the problem of the above (1).

That is, (i) in view of enhancement of adhesion, there have been proposed various technologies for enhancing the adhesion with a substrate, by performing UV-ray treatment onto a pressure sensitive adhesive layer of an adhesive sheet (for example, refer to PATENT DOCUMENTS 1 to 3).

For example, in PATENT LITERATURE 2, there has been disclosed a production method of an adhesive sheet superior in bonding force between the substrate and the adhesive layer, wherein the surface of various known adhesive layers to be bonded with the substrate is subjected to activation treatment such as corona discharge treatment, plasma treatment, UV-ray treatment, and in the case of UV-ray treatment, it is irradiated with an energy of 10 mJ/cm or higher, also, in the case of corona treatment, a surface wetting index of an additive-free polyethylene film is treated at 34 dyn/cm or higher, preferably 40 dyn/cm or higher.

However, depending on the material of a pressure sensitive adhesive, enhancement effect or stability of adhesion by UV-ray treatment thereof or the like differs, and it is not an almighty method. In particular, as for a silicone-based pressure sensitive adhesive attracted the attention as an optical material superior in transparency or heat resistance, because of having such characteristics specific to silicone that the silicone surface hydrophilized by surface activation treatment becomes hydrophobic quickly, surface treatment effect is deactivated in a short period of time, and thus enhancement of adhesion by surface activation treatment has been said to be difficult (for example, refer to NON PATENT LITERATURE 1).

This hydrophobic recovery, which means quick return to hydrophobic property, is generated by diffusion of low molecular weight siloxane from inside to the surface, or by coming out of a methyl group component, whose concentration was decreased by generation of a hydrophilic group at the surface, to the surface by re-orientation caused by molecular motion, usually, it returns to an original hydrophobic state, for example, within about 24 hours after plasma treatment. Accordingly, although various challenges have been performed to suppress hydrophobic recovery and to achieve the maintenance of stable hydrophilic property, an essential solution has not been attained at present.

In addition, (ii) in an adhesion film for surface protection, a method for satisfying both rework property and adhesion, by performing UV-ray treatment or the like onto an adhesive layer, has also been proposed (for example, refer to PATENT LITERATUREs 4 and 5).

However, the above adhesion film for surface protection is not the one for adhering firmly with the adherend, in view of use purpose thereof, and is difficult to secure adhesion which can satisfy the above point pressurization test, and thus is not the one for applying technology of a surface protection film or the like to the functional adhesive sheet.

Still more, (iii) the present applicants have also proposed a silicone-based adhesive sheet which satisfies both rework property and adhesion (refer to PATENT LITERATURE 6), however, in view of securing adhesion in a degree of passing the above point pressurization test, it has still room for improvement, in particular, in low-hardness silicone gel, securing of adhesion is difficult, and technological hurdle to enhance the adhesion thereof is high.

In addition, (iv) as a means for making satisfied both adhesion in a degree of passing the above point pressurization test and rework property, such a means is said effective that initially provides low tackiness enabling to rework to an adherend, and after lamination increases the adherence force with time, and for example, there has been proposed a pressure adhesive agent modified with a functional group in which the surface of the pressure adhesive agent exhibits adhesion reactivity by an interface contact reaction, and an adhesive sheet provided with pressure adhesive agent thereof (for example, refer to PATENT LITERATURE 7).

However, the above means and methods need optimization of the functional group exhibiting adhesion reactivity by each adherend, and thus have a problem of requiring a lot of labor.

As described above, although technology and means (techniques) of the above (i) to (iv) have been proposed as technology to improve or solve the problem, they are not sufficient as technical idea to solve the above (1) securing of adhesion, (2) workability by maintaining light peeling property or (3) rework property, and the transparent adhesive sheet for optics which is capable of satisfying both securing of adhesion, which can pass the above point pressurization test, and rework property has earnestly been desired.

CITATION LIST

Patent Literature

PATENT LITERATURE 1: JP-A-07-173448
PATENT LITERATURE 2: JP-A-01-081827
PATENT LITERATURE 3: JP-A-2009-086452
PATENT LITERATURE 4: JP-A-2001-240820
PATENT LITERATURE 5: JP-A-2005-200606
PATENT LITERATURE 6: JP No. 4500888 (WO/2009/063847)
PATENT LITERATURE 7: JP-A-2001-323247

Non Patent Literature

NON PATENT LITERATURE 1: M. J. Owen, Australian Journal of Chemistry, Vol. 58, p. 433 (2005)

SUMMARY OF INVENTION

Technical Problem

It is an object of the present invention to provide the transparent adhesive sheet for optics satisfying both adhesion and rework property, and the production method thereof, in view of the above conventional technical problems.

Solution to Problem

The present inventors have intensively studied a way to solve the above-described problems and by noticing a means for initially providing low tackiness enabling to rework for the adherend, and after lamination increases adhesion with time, and as a result of various experiments and considerations of the experiment results, astonishingly found that:

(A) by performing surface activation treatment using irradiation of energy-rays of a specific wavelength range on to the adhesive face, surface treatment effect is maintained without bringing hydrophobic recovery, which is specific to surface treatment onto a silicone material and was difficult to avoid, (B) such a silicone-based transparent adhesive sheet for optics can be prepared that has suitable adhesive force in laminating onto the adherend, as well as superior workability (including rework property), and that adhesion with the adherend increases with time after lamination, and (C) the above increasing effect of adhesion with the adherend with time is maintained with time, by laminating a specific surface layer which can be peeled (in other word, an activity maintaining layer),
and have thus completed the present invention, based on the above knowledge.

That is, according to a first aspect of the present invention, there is provided a production method of a silicone-based transparent adhesive sheet for optics for assembling the optical components, characterized by forming a surface activation treated surface, in which peel strength after laminating onto the adherend increases with time, as compared with peel strength before lamination, by performing surface activation treatment using UV-ray irradiation on at least apart or the entire surface of an adhesive face contacting with the adherend of said transparent adhesive sheet for optics.

In addition, according to a second aspect of the present invention, in the first aspect, there is provided the production method of the transparent adhesive sheet for optics, characterized in that wavelength of the UV-ray irradiation treatment is 365 nm or less, and irradiation integrated light quantity is 30 mJ/cm$^2$ or less.

In addition, according to a third aspect of the present invention, in the first or the second aspect, there is provided the production method of the transparent adhesive sheet for optics, characterized in that the UV-ray irradiation treatment is an excimer UV-ray irradiation treatment.

Still more, according to a fourth aspect of the present invention, in the first aspect, there is provided the production method of the transparent adhesive sheet for optics, characterized in that, as for peel strength (B) after 24 hours of lamination onto the adherend, increased amount of peel strength (B−A) is 1 N/20 mm or more, relative to peel strength (A) of initial lamination, in a 90 degree peeling mode of a adhesion force test, in accordance with JIS Z0237.

According to a fifth aspect of the present invention, in the first aspect, there is provided the production method of the transparent adhesive sheet for optics, characterized in that an activity maintaining layer is still more laminated on the surface activation treated surface.

In addition, according to a sixth aspect of the present invention, in the fifth aspect, there is provided the production method of the transparent adhesive sheet for optics, characterized in that the activity maintaining layer is a release film having a peel treatment layer selected from an alkyd resin-based, an aliphatic amide-based, a fluoro-silane-based, or a fluoro-silicone-based.

Still more, according to a seventh aspect of the present invention, there is provided a transparent adhesive sheet for optics characterized by being obtained from the production method relevant to any of the first to the sixth aspect.

In addition, according to an eighth aspect of the present invention, there is provided a production method of a laminated body, characterized by laminating the adherend composed of optical components selected from a protection panel, a polarizing plate, a retardation film, a diffusion film or a liquid crystal display apparatus, on the surface activation treated surface of the transparent adhesive sheet for optics obtained from the production method relevant to any of the first to the fourth aspects.

Still more, according to a ninth aspect of the present invention, there is provided a laminated body, characterized by being obtained from the production method relevant to the eighth aspect.

In addition, according to a tenth aspect of the present invention, there is provided optical components obtained by using the transparent adhesive sheet for optics or the laminated body relevant to the seventh or the ninth aspect.

Still more, according to an eleventh aspect of the present invention, there is provided a production apparatus of the transparent adhesive sheet for optics, characterized by being used in the production method of the transparent adhesive sheet for optics relevant to any of the first to the sixth aspects.

The present invention, as described above, relates to the production method of a silicone-based transparent adhesive sheet for optics for assembling the optical components or the like, however, preferable aspects thereof encompass the following:

(1) In the first aspect, a production method of the transparent adhesive sheet for optics, characterized in that the silicone-based transparent adhesive sheet for optics is composed of silicone gel having the hardness of an Asker C hardness as specified by SRIS 0101 of 0 to 30, or a penetration (25° C.) in accordance with JIS K2207 "Petroleum asphalt" of 20 to 200, and (2) In the eleventh aspect, a production apparatus of the transparent adhesive sheet for optics, characterized by being provided with a surface activation treatment apparatus.

Advantageous Effects of Invention

According to the production method of the transparent adhesive sheet for optics of the present invention, the obtained silicone-based transparent adhesive sheet for optics for assembling the optical components has suitable adhesive force in laminating onto the adherend, and also rework is possible, therefore productivity or cost of laminating work is improved, and after lamination, adhesion with the adherend increases with time, and thus defect such as peeling is prevented, and stable quality can be realized.

In addition, because, by covering with a release film which functions as an activation maintaining layer till lamination, increase in peel strength with time can be suppressed, while maintaining effect of surface activation treatment such as effect of UV-ray treatment, which has been said difficult conventionally, stable lamination superior in storage property can be achieved.

In addition, in the present invention, by performing surface activation treatment using irradiation of energy-rays with wavelength below that of visible light such as UV-ray treatment onto a surface of silicone-based hardened body, production of the transparent adhesive sheet for optics, having enhanced adhesion (adhesive property) with the adherend, can be performed continuously, and still more, such significant effect can be exerted that high adhesion (adhesive property) can be obtained stably.

Still more, the present invention is applicable also to a non-transparent silicone-based adhesive sheet, without being limited to optical uses, and can be used in wider uses.

DESCRIPTION OF EMBODIMENTS

Figure 1:
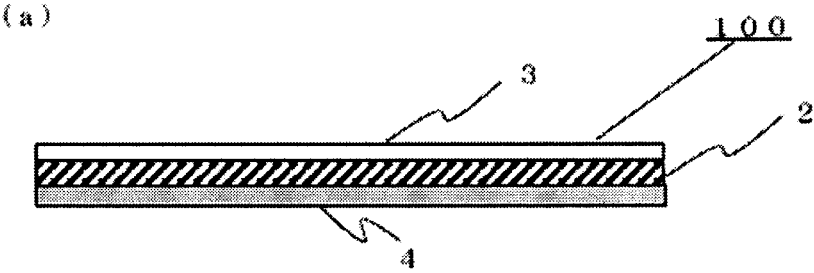
FIG. 1 is a schematic drawing explaining a configuration example of a laminated body of the transparent adhesive sheet for optics according to an embodiment of the present invention.
Figure 1:
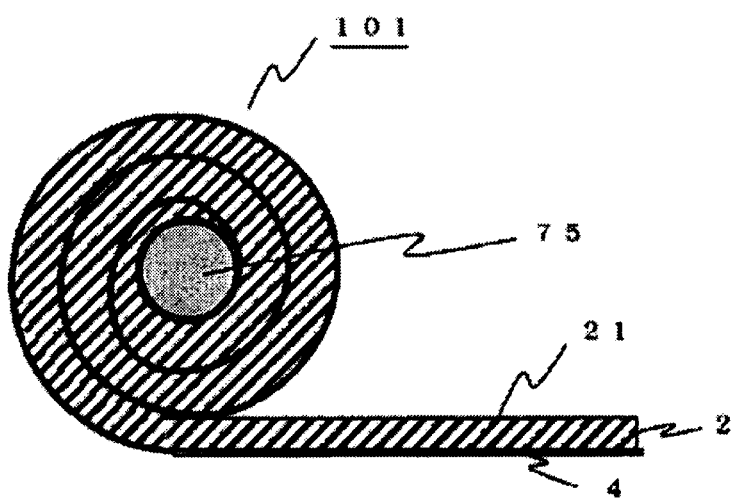
Figure 1:
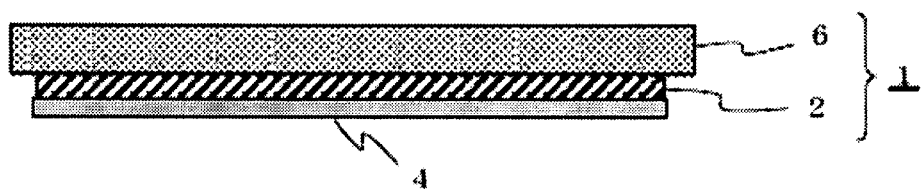
Figure 1:
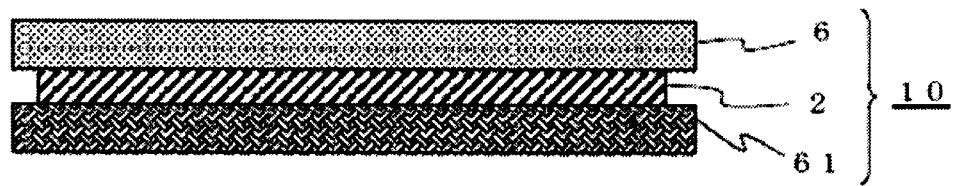

The production method of the present invention for a silicone-based transparent adhesive sheet for optics for assembling the optical components is the production method of transparent adhesive sheet for optics characterized by forming a surface activation treated surface, where peel strength after laminating onto the adherend increases with time, as compared with peel strength before lamination, by performing surface activation treatment using UV-ray irradiation on at least a part or the entire surface of an adhesive face contacting with the adherend of said transparent adhesive sheet for optics.

In addition, as another aspect of the present invention, the production method of the present invention for the transparent adhesive sheet for optics for assembling the optical components is the production method of transparent adhesive sheet for optics characterized in that an activity maintaining layer is still more laminated on the surface activation treated surface.

Explanation will be given below by each item.

1. Transparent Adhesive Sheet for Optics (1) Pressure Sensitive Adhesive

In the transparent adhesive sheet for optics relevant to the present invention, a transparent pressure sensitive adhesive composed of at least one kind of transparent gel selected from transparent silicone-based gel, acryl-based gel, polyolefin-based gel, polyurethane-based gel, butadiene gel, isoprene gel, butyl gel, styrene-butadiene gel, copolymer gel of ethylene-vinyl acetate, ethylene-propylene-diene terpolymer gel, or fluoro gel is used as a pressure sensitive adhesive, and silicone-based gel is particularly preferable.

As the above silicone-based gel, the one formed from an addition reaction-based silicone-based gel having tackiness is particularly preferable.

It is desirable that the hardness of the above silicone-based gel has Asker C hardness as specified by SRIS 0101 of 0 to 30, or a penetration (25° C.) in accordance with JIS K2207 "Petroleum asphalt" is 20 to 200.

In addition, in the present invention, "transparent" encompasses being colorless, transparent, colored but transparent, and translucent, and total light transmittance (in accordance with JIS K7105 "An optical characteristics test method of plastics") of visible light with a wavelength range of 380 to 780 nm, of transparent silicone-based gel to be used in the present invention, is preferably 80% or higher, more preferably 85% or higher, and particularly preferably 90% or higher.

Transmittance is an index of transparency degree of a transparent member, and in the case where transmittance is below 80%, for example, light emitted from a screen becomes difficult to transmit through the transparent member, which thus decreases visibility. In addition, in the case where a wavelength range having a transmittance of 80% or higher is narrower than a range of 80 nm to 780 nm, transmittance of light at a red color side (long wavelength side) or a blue color side (short wavelength side) decreases, and is thus not preferable. Here, transmittance is a value measured using a spectrophotometer or the like.

As the above addition reaction type silicone gel, a silicon compound generally used, as conventionally known and commercially available various silicone materials, may be selected, as appropriate, and used. Accordingly, any of heat curing type or normal temperature curing type, a condensation type or addition type in curing mechanism, can be used, and in particular, silicone gel obtained from the addition type silicone composition is preferable. In addition, a group binding to a silicon atom is also not especially limited, and includes, for example, an alkyl group such as a methyl group, an ethyl group, a propyl group or the like; a cycloalkyl group such as a cyclopentyl group, a cyclohexyl group or the like; an alkenyl group such as a vinyl group, an allyl group or the like; an aryl group such as a phenyl group, a tolyl group or the like, as well as the one where a hydrogen atom of these groups is partially substituted with other atom or a binding group.

As the specific addition reaction-based silicone gel material, trade name CF-5106 (penetration of 150), produced by Dow Corning Toray Co., Ltd, or the like is preferable, and this silicone gel material has a raw material silicone resin divided into A liquid and B liquid, and silicone gel having desired penetration can be obtained by mixing and heating these two liquids in predetermined ratio.

A production method of the addition reaction type (or cross-linked) silicone gel, to be used in the present invention, is not especially limited, however, it is usually obtained by using organohydrogenpolysiloxane and alkenylpolysiloxane as raw materials, and subjecting both to a hydrosilylation reaction (an addition reaction) in the presence of a catalyst to be described later.

The silicone gel has tackiness derived from non-cross-linking functional group of the surface, however, for example, the one applied with a known method forgiving tackiness can also be used, such as the one blended with an MQ resin type tackifying component, or by adding a non-reactive adhesive component, or by adjusting length of the side chain of the non-cross-linking functional group or kind of a terminal functional group to exert tackiness, or the like.

(2) Activity Maintaining Layer

An embodiment of the production method of the transparent adhesive sheet for optics of the present invention is characterized in that an activity maintaining layer is still more laminated on the surface activation treated surface.

By laminating the activity maintaining layer onto the surface activation treated surface, decrease in effect of surface activation treatment can be suppressed. Detailed mechanism thereof is not clear at present.

The activity maintaining layer is required to be capable of being peeled from the surface activation treated surface, in addition to suppressing decrease in effect of surface activation treatment by being laminated onto the surface activation treated surface. Accordingly, because the activity maintaining layer functions also as a release film (it may also be referred to as a release liner), a known release film can be used as the activity maintaining layer.

The release film includes a film composed of an organic resin such as a polyethersulfone resin, a cellulose acetate resin, a polyimide resin, a polyester resin, a polyether resin, an epoxy resin, a phenolic resin, a polyamide resin, a polyolefin (for example, polypropylene); a film composed by laminating these organic resins on other release organic resins; or a film by covering these organic resins on the surface of non-release substrate films, however, in the embodiment of the present invention, because the release film to be used as the activity maintaining layer is peeled and removed in laminating onto the adherend, the release film having a peeling treated layer superior in peeling property is preferable, and as the peel treatment layer, an alkyd resin-based, an aliphatic amide-based, or a fluoro-silane-based, or a fluoro-silicone-based is preferable.

2. Production Method of the Transparent Adhesive Sheet for Optics

The production method of a silicone-based transparent adhesive sheet for optics of the present invention is characterized by forming a surface activation treated surface, where peel strength after laminating onto the adherend increases with time, as compared with peel strength before lamination, by performing surface activation treatment on at least a part or the entire surface of an adhesive face contacting with the adherend of said transparent adhesive sheet for optics.

(1) Surface Activation Treatment

The production method of a silicone-based transparent adhesive sheet for optics of the present invention is characterized by performing surface activation treatment on at least a part or the entire surface of an adhesive face contacting with the adherend of the transparent adhesive sheet for optics, and the surface activation treatment is not especially limited, as long as it is possible to form a surface activation treated surface, where peel strength after laminating onto the adherend increases with time, as compared with peel strength before lamination.

In the present invention, the surface activation treatment includes known methods, for example, a chemical surface treatment method such as UV-ray treatment, corona discharge treatment (in air, in nitrogen, in carbon dioxide or the like), plasma treatment (high pressure, low pressure), treatment with an alkali metal solution, high frequency sputtering etching treatment or the like, and preferably irradiation treatment using energy-rays having wavelength below that of visible light. As energy-rays having wavelength below that of visible light in the treatment, UV-rays, X-rays, y-rays, electron beams and the like can be applicable, however, preferably UV-rays. In addition, treatment by energy-rays having energy-rays below visible light wavelength is performed preferably by single wavelength, more preferably by UV-rays having single wavelength, and still more preferably by excimer UV.

It should be noted that "single wavelength" in the present invention means a state giving one peak in spectral intensity-wavelength distribution, and value of the single wavelength is wavelength of said peak.

In the above UV-ray treatment, a substrate surface is treated for surface activation by UV-rays irradiated from a low pressure mercury lamp or an excimer UV-ray lamp. Major wavelength contributing to surface modification composes a plurality of wavelength distribution having, as the main wavelength, 185 nm and 254 nm in the case of the low pressure mercury lamp, and 365 nm in the case of the high pressure mercury lamp, however, in the present invention, it is preferable to be single wavelength.

This single wavelength UV-rays is obtained by a method for combining a filter with a UV-ray light source, or using the excimer UV lamp as a light source, however, in the present invention, it is more preferable to be the excimer UV treatment having a simple structure.

The above excimer UV is UV-rays having nearly single wavelength, and wavelength in xenon excimer UV is 172 nm. In general, in the excimer UV, attenuation in air is large, which requires to place a light source closer to the surface of a substance to be treated (to several mm), in surface treatment, as compared with the low pressure mercury lamp, however, on the other hand, it has characteristics that generation efficiency of ozone contributing to surface treatment is high, and treatment capability is high.

In addition, the excimer lamp is incoherent excimer light, and any of the one utilizing dielectrics barrier discharge, the one utilizing hollow cathode discharge, and the one utilizing microwave discharge may be applicable. Wavelength emitted is determined by kind of discharge gas filled in a lamp, and for example, emission center wavelength in using argon as discharge gas is 126 nm, emission center wavelength in using krypton as discharge gas is 146 nm, emission center wavelength in using xenon as discharge gas is 172 nm, emission center wavelength in using krypton chloride as discharge gas is 222 nm, and emission center wavelength in using xenon chloride as discharge gas is 308 nm.

As short wavelength UV-rays in the present invention, a wavelength of 365 nm or less is preferable, and still more, in the case where excimer UV treatment is applied, the one having a wavelength of 310 nm or less can be applied, as appropriate. In addition, as excimer UV treatment, treatment using a coherent excimer laser may also be adopted as a light source.

It should be noted that UV-rays in the present invention includes near UV-rays (wavelength range of 200 to 380 nm), far UV-rays (a wavelength range of 10 to 200 nm), and extreme UV-rays (wavelength range of 1 to 10 nm).

(2) Irradiation Condition of Energy-rays with Wavelength Below that of Visible Light Irradiation of energy-rays with wavelength below that of visible light, such as UV-ray treatment in the present invention, is characterized to be set under extremely mild condition, as compared with conventional irradiation condition of the above energy-rays, and it is adjusted, as appropriate, in response to wavelength (or wavelength range) of the energy-rays to be irradiated. Integrated light quantity among irradiation conditions has a preferable range in response to wavelength (or wavelength range) of the energy-rays to be irradiated, and the shorter wavelength (or wavelength range) shifts to the lower limit value and the upper limit value of a preferable range to the smaller value. As one example, in UV-ray treatment with single wavelength, in particular, excimer UV treatment, it is preferable that integrated light quantity is set to be 30 mJ/cm$^2$ or less, and in the case of xenon excimer UV (a wavelength of 172 nm) to be at 0.01 to 30 mJ/cm$^2$ is preferable, 0.1 to 30 mJ/cm$^2$ is more preferable, and 2 to 15 mJ/cm$^2$ is still more preferable, and 5 to 12 mJ/cm$^2$ is particularly preferable. In addition, the higher illuminance of the energy-rays provides the easier penetration inside adhesive layer, thus adjustment of illuminance together is preferable.

Still more, aiming at securing longer rework period, such treatment condition may be adopted that adhesion strength is lowered than initial adhesion strength before treatment, by intentionally increasing integrated light quantity or the like, so as to lengthen increase speed of adhesion strength (arrival time to the specified adhesion strength) after lamination. As another application of this condition, such a method is also effective that, while decreasing initial tackiness of an adhesive sheet, which originally has large adhesive force, to a degree giving easy handling, so as to give adhesion showing adhesion strength based on initial tackiness or higher, by change with time, after lamination onto the adherend.

In the present invention, by performing surface activation treatment using irradiation of energy-rays with wavelength below that of visible light such as UV-ray treatment, detailed mechanism to exert enhancement action of adhesive force of the pressure sensitive adhesive layer different from conventional one, and maintaining characteristics thereof has not been clarified yet at present, however, it is considered that as a result of surface roughening of the surface of the pressure sensitive adhesive layer due to surface activation treatment, the pressure sensitive adhesive becomes easy to enter fine gaps of the surface of the adherend, resulting in generation of anchor effect for exerting strong adhesive force in a way that the pressure sensitive adhesive intrudes in those fine gaps as anchors; or by generation of a carbonyl group or a carboxyl group at the surface of the pressure sensitive adhesive, so as to polarize the surface, adhesive force is enhanced by an action in a multiple way.

In addition, because energy-rays with short wavelength is high energy, it has property giving easy absorption to air or a substance present in space, and thus energy-rays with the shorter wavelength gives the shallower penetration depth inside the pressure sensitive adhesive layer, as well as the smaller integrated light quantity provides the shallower penetration depth inside the pressure sensitive adhesive layer, from which it is estimated that alteration (modification) at the extreme vicinity of the surface of the pressure sensitive adhesive layer, as compared with conventional case, by irradiation of energy rays having smaller energy (condition of smaller integrated light quantity), as compared with a conventional way, which is characteristics of the present invention, participates to expression of unique action effect of the present invention, such as enhancement of adhesive force or maintaining property thereof.

In addition, in comparing contact angle before and after treatment of the surface treatment surface, it is found that difference thereof before and after treatment is extremely small, thus it is estimated as one cause that degree of hydrophilization is in an extremely small state, as compared with a conventional level.

In addition, it is preferable that the activity maintaining layer is still more laminated on the surface activation treated surface, for example, by covering (in sheet-like or a roll-like) the silicone gel treated surface with a release film, adhesive force enabling to rework is maintained, and after lamination to the adherend, adhesive force is enhanced with time, and adhesion is secured.

(3) Production Method of the Transparent Adhesive Sheet for Optics

The production method of the transparent adhesive sheet for optics of the present invention is composed of a step for forming the transparent adhesive sheet for optics to be subjected to surface activation treatment, and a step for surface activation treatment, and the step for surface activation treatment is a step for performing surface activation treatment, using a surface treatment apparatus, at parts requiring surface activation, while in the step for forming the transparent adhesive sheet for optics, a known method can be applied.

Explanation will be given below, using FIG. 2, specifically on the production method, using, as an example, an embodiment of continuous production of a heat curing-based (silicone) transparent adhesive sheet for optics, however, the present invention should not be limited to the present embodiment.

Figure 2:
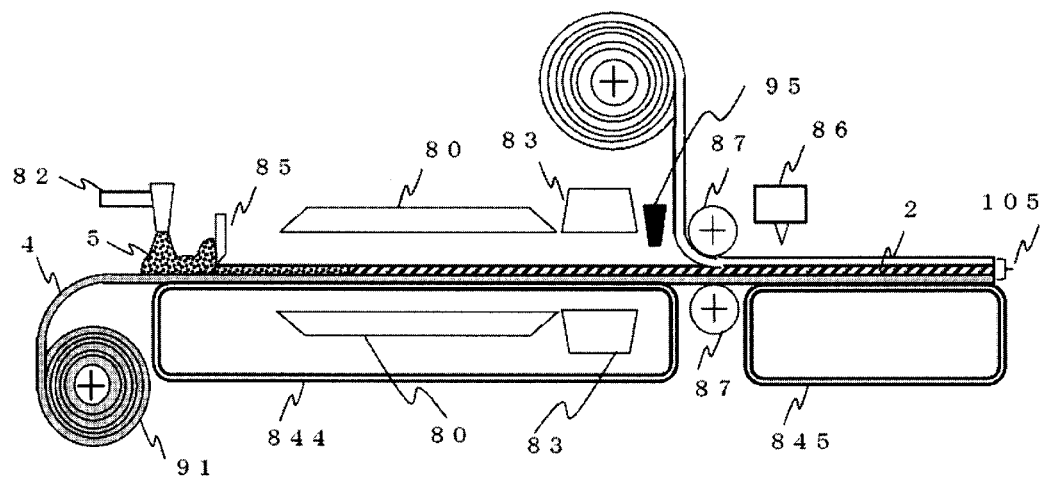
FIG. 2 is a schematic drawing explaining the production method of the transparent adhesive sheet for optics according to an embodiment of the present invention.

FIG. 2 is a schematic drawing of a continuous production apparatus for the transparent adhesive sheet for optics.

Firstly, an uncured pressure sensitive adhesive composition is coated in predetermined thickness onto a release film, and while keeping the surface coated in open state as it is, the coated surface is cured in a curing zone, and the coated surface of the optical transparent adhesive sheet, which was discharged from the curing zone, is subjected to surface activation treatment using a surface activation treatment apparatus, and then a release film, which will become an activation maintaining layer, is laminated to obtain the transparent adhesive sheet for optics having a configuration of FIG. 1(a), laminated with the activity maintaining layer.

Figure 3:
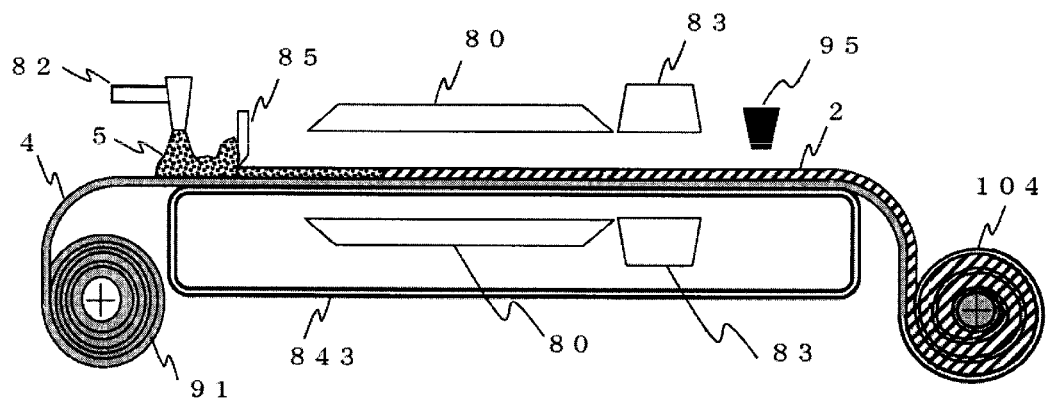
FIG. 3 is a schematic drawing explaining another aspect of the production method of the transparent adhesive sheet for optics according to an embodiment of the present invention.

In addition, as another embodiment, as shown in FIG. 3, on a release film having pealing treated at both surfaces, an uncured pressure sensitive adhesive composition is coated in predetermined thickness, and while keeping the surface coated in open state as it is, the coated surface is cured in a curing zone, and the coated surface of the optical transparent adhesive sheet, which was discharged from the curing zone, is subjected to surface activation treatment using a surface activation treatment apparatus, and then the surface activation treated surface is wound in a roll state, while making contacted to the back surface of the above release film to obtain an embodiment of FIG. 1(b). In this case, peel treatment functional part of the above release film functions as the activity maintaining layer.

Figure 4:
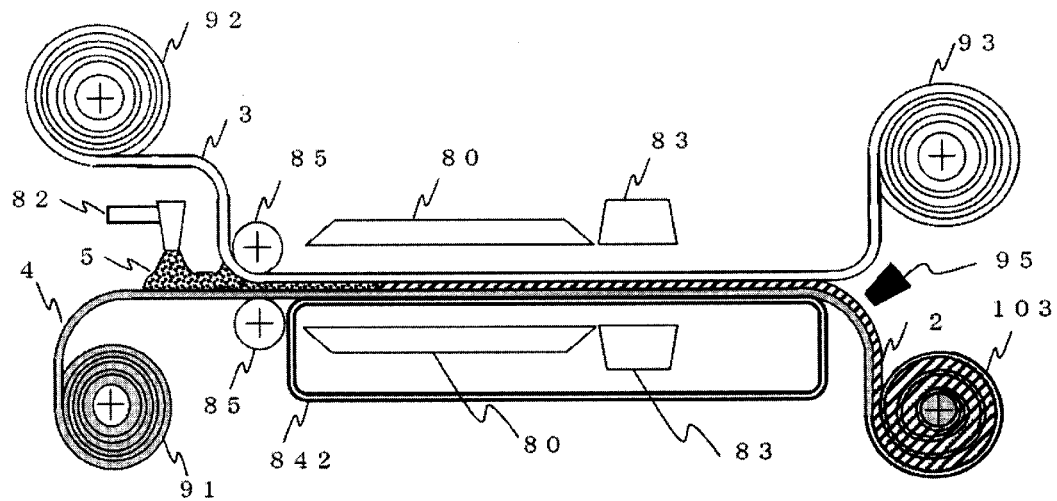
FIG. 4 is a schematic drawing explaining another aspect of the production method of the transparent adhesive sheet for optics according to an embodiment of the present invention.

Still more, as another aspect of FIG. 3, as shown in FIG. 4, such an embodiment may be adopted that, after curing an uncured pressure sensitive adhesive composition in a sandwiched state with another substrates, one of the substrates is peeled to perform surface activation treatment at the peeled surface of the hardened body.

It should be noted that the transparent adhesive sheet for optics before surface activation treatment formed by a system of FIG. 2 and FIG. 3, has smaller tackiness at the open and cured surface, as compared with a substrate contact side, and different tackiness can be set, in advance, before surface activation treatment, between the front and the back surfaces, therefore design flexibility is widened for making different tackiness between the front and the back surfaces, which is required in peeling selectivity in rework, without relying it only on surface activation treatment, and thus it is useful. In addition, also in the method of FIG. 4, by combining different kind of substrate surface to be contacted to the both surfaces of the uncured pressure sensitive adhesive composition, adjustment of making different pressure sensitive adhesion between the front and the back surfaces, similar to FIG. 2 and FIG. 3, is possible.

3. Property and Performance of the Transparent Adhesive Sheet for Optics

The transparent adhesive sheet for optics obtained by the production method of the transparent adhesive sheet for optics of the present invention has, at least a part or the entire surface of an adhesive face contacting with the adherend, surface activation treated surface where peel strength after laminating onto the adherend increases with time, as compared with peel strength before lamination, therefore has suitable adhesive force in laminating onto the adherend, and rework thereof is also possible, therefore productivity or cost of laminating work is improved, as well as adhesion with the adherend increases with time after lamination, and thus defect such as peeling can be prevented, and stable quality can be achieved. That is, the transparent adhesive sheet for optics of the present invention is the one satisfying both adhesion and rework property.

Also in a conventional pressure sensitive adhesive material, there may be the case where adhesion increases with time, depending on temperature or compatibility with the adherend, however, in the present invention, increase in adhesion with time is significantly promoted by surface activation treatment, as well as increased amount of adhesion with time can be adjusted by condition of surface activation treatment.

A surface activation treated surface of the transparent adhesive sheet for optics of an embodiment of the present invention is characterized in that, increased amount (B−A) of peel strength of peel strength (B) after 24 hours have passed, relative to peel strength (A) of initial adhesion when laminated onto the adherend, is 1 N/20 mm or more, in a 90 degree peeling mode of a adhesion force test, in accordance with JIS Z0237. By this characteristics, satisfaction of both of adhesion with the adherend, and rework property in lamination work can be achieved better. It should be noted that the initial of adhesion means 20 minutes after surface activation treatment (including lamination work onto the adherend). In addition, as the adherend here, a release film which functions as the activation maintaining layer is not included.

In addition, stable lamination superior in storage property can be realized, because by covering with the activation maintaining layer till lamination onto the adherend, increase in peel strength with time with the activity maintaining layer in a storage state, before lamination on to the adherend, can be suppressed, while maintaining enhancement effect of tackiness or enhancement effect of adhesion with time by surface activation treatment such as UV-ray treatment, peeling stability of the activity maintaining layer can be secured.

4. Laminated Body of the Transparent Adhesive Sheet for Optics and the Production Method Thereof.

The laminated body of the transparent adhesive sheet for optics of the present invention is the one closely laminated with optical components as the adherend at the surface activation treated surface of the transparent adhesive sheet for optics, and as the optical components, a protection panel, a polarizing plate, a retardation film, a diffusion film, a liquid crystal display apparatus, a light guide plate, a touch panel element, a planar light emitting device and the like are applicable in response to applications and objectives, and is used, for example, as a display apparatus unit or a touch panel unit, a lighting unit or composing parts thereof. Schematically, it has such a configuration, as shown in FIG. 1 (c), that the optical components are attached at one surface (the other surface may be attached with, for example, a release film (B), and in use the release film (B) is peeled and removed), or a configuration laminated with the optical components at both surfaces, as shown in FIG. 1 (d).

As the laminated body of the transparent adhesive sheet for optics, the optical components may be laminated onto the transparent adhesive sheet for optics just after surface activation treatment, or lamination may be performed using the transparent adhesive sheet for optics laminated with the activity maintaining layer, at the surface activation treated surface where the activity maintaining layer was peeled.

Lamination of the transparent adhesive sheet for optics and the optical components is not especially limited, as long as it is a method enabling lamination without entraining air bubbles, however, a roller lamination method, a vacuum lamination method or the like may be applicable.

Re-lamination (rework) is possible, as long as it is within a certain period of time after lamination of the transparent adhesive sheet for optics onto the optical components, and the laminated body of the transparent adhesive sheet for optics can be obtained, where the transparent adhesive sheet for optics and the optical components are closely adhered, in a state that peeling or air bubbles are never generated in a point pressurization test, by increasing adhesion with time after passing the above time.

EXAMPLES

Explanation will be given below specifically on the present invention with reference to Examples, however, the present invention should not be limited to these Examples.

Examples 1 to 14

Laminated bodies of the transparent adhesive sheet for optics were prepared by the following procedure.

The transparent adhesive sheet for optics is formed via (i) a forming step for setting thickness by supplying an uncured liquid viscoelastic material onto a resin film (B), (ii) a heating step for performing thermal curing, in an open state, without attaching a release film (A), after forming, and (iii) a cooling step for cooling the cured sheet obtained by the heating and curing step, and (iv) after forming a surface activation treated surface by surface activation treatment using an excimer UV treatment apparatus, at the thermally cured surface in an open state in the above heating step, via a release film attaching step for attaching the release film (A), as an activity maintaining layer, onto the surface activation treated surface, the laminated body of the transparent adhesive sheet for optics with a size of 200 mm×200 mm×0.5 mm in thickness, having penetration hardness of 100, was obtained, where the release film (A), the transparent adhesive sheet for optics and the release film (B) were laminated in this order.

As an uncured liquid silicone gel raw material, the one blended with two-component addition reaction-based silicone gel (model: SLJ3363, with a total light transmittance in air of 90%), manufactured by Wacker Asahikasei Silicone Co., Ltd., in a ratio of 55 parts by weight/45 parts by weight, as A liquid (main agent+cross-linking promoter)/B liquid (main agent+cross-linking agent).

As the release film (A), an alkyd resin-based release film (model: T-9, film thickness: 0.1 mm), manufactured by Panac Co., Ltd. was used, while as the release film (B), a fluorosilicone-based release film (model: FZ, film thickness: 0.1 mm), manufactured by Unitika Co., Ltd. was used As the procedure of the forming step, thickness setting in the forming step of (i) was performed by a method for spreading the release film (B), with a peeling acting surface upward, onto a flat glass substrate, and still more placing a spacer of an aluminum mold frame with an inner size of 200 mm×200 mm×0.5 mm in thickness, onto the release film (B), and after flowing the uncured silicone gel raw material into full space of the above mold frame, and making squeegee along the upper surface of the mold frame using a squeegee plate, to remove the excess uncured silicone gel raw material.

Curing of the heating step (ii) was subjected to thermal curing in a hot air type oven at 75° C. for 1 hour, and cooling of (iii) was performed by natural cooling at room temperature (25° C.) on a wooden plate.

In addition, surface activation treatment of (iv) was performed in air, using an excimer UV treatment apparatus (manufactured by M D. Excimer Co., Ltd.) for treating using a xenon excimer UV lamp (a wavelength of 172 nm), in an illuminance of 50 mW/cm² (measurement value at a lamp tube surface in air, by a sensor head C8025-172, of a meter C8026, manufactured by Hamamatsu Photonics Co., Ltd.), under condition of integrated light quantity shown in Table 1, by adjusting irradiation intensity, irradiation distance, and irradiation time (or carrying time).

Examples 15 to 21

Laminated bodies of transparent adhesive sheet for optics of Examples 15 to 21 were prepared similarly as in Example 1, except by performing surface activation treatment of (iv), in Example 1, in air, using an excimer UV treatment apparatus (manufactured by M D. Excimer Co., Ltd.) for treating using a krypton chloride (KrCl) excimer UV lamp (a wavelength of 222 nm), in an illuminance of 27 mW/cm², under condition of integrated light quantity shown in Table 2.

Examples 22 to 25

Laminated bodies of transparent adhesive sheet for optics of Examples 22 to 25 were prepared similarly as in Example 1, except by performing surface activation treatment of (iv), in Example 1, in air, using an xenon chloride (XeCl) excimer UV lamp (a wavelength of 308 nm, SUS13, manufactured by Ushio Inc.), in an illuminance of 4 mW/cm², under condition of integrated light quantity shown in Table 2.

Examples 26 to 28

Laminated bodies of transparent adhesive sheet for optics of Examples 26 to 28 were prepared similarly as in Example 1, except by changing size of the transparent adhesive sheet for optics to be treated to 24 mm×200 mm×0.5 mm in thickness, in performing surface activation treatment of (iv), in Example 1, and in a vacuum chamber (1 Torr), using an argon (Ar) excimer UV lamp (a wavelength of 126 nm, SUS11, manufactured by Ushio Inc.), in an illuminance of 4 mW/cm², under condition of integrated light quantity shown in Table 2.

Examples 29 to 31

Laminated bodies of transparent adhesive sheet for optics of Examples 29 to 31 were prepared similarly as in Example 1, except by performing surface activation treatment of (iv), in Example 1, in air, using an UV treatment apparatus (UVC-1212/1MNLC3-AA03, manufactured by Ushio Inc.), for treating using a metal halide lamp (a wavelength of 250 to 460 nm, and a main peak wavelength of 375 nm), under condition of integrated light quantity shown in Table 2.

Comparative Example 1

Laminated bodies of the transparent adhesive sheet for optics of Comparative Example 1 was prepared similarly as in Example 1, except by not performing surface activation treatment, in Example 1.

It should be noted that, in the Examples and Comparative Example, performance or the like relating to the transparent adhesive sheet for optics or the like was evaluated in accordance with the following evaluation methods.
1. Evaluation Methods
(1) Hardness:
Hardness was determined by a penetration measurement method for penetration, in accordance with JIS K2207, "Petroleum asphalt", or Asker C hardness, as specified by SRIS 0101, was determined.

(2) Peel Strength:

Peel strength between a surface activation treated surface of the transparent adhesive sheet for optics and the adherend was determined by measuring 90 degree adhesion force in a adhesion force test, in accordance with JIS Z0237, "Testing method of pressure sensitive adhesive tapes and sheets", using a 90 degree peeling test machine, under a rate of elongation of 300 mm/min.

Figure 9:
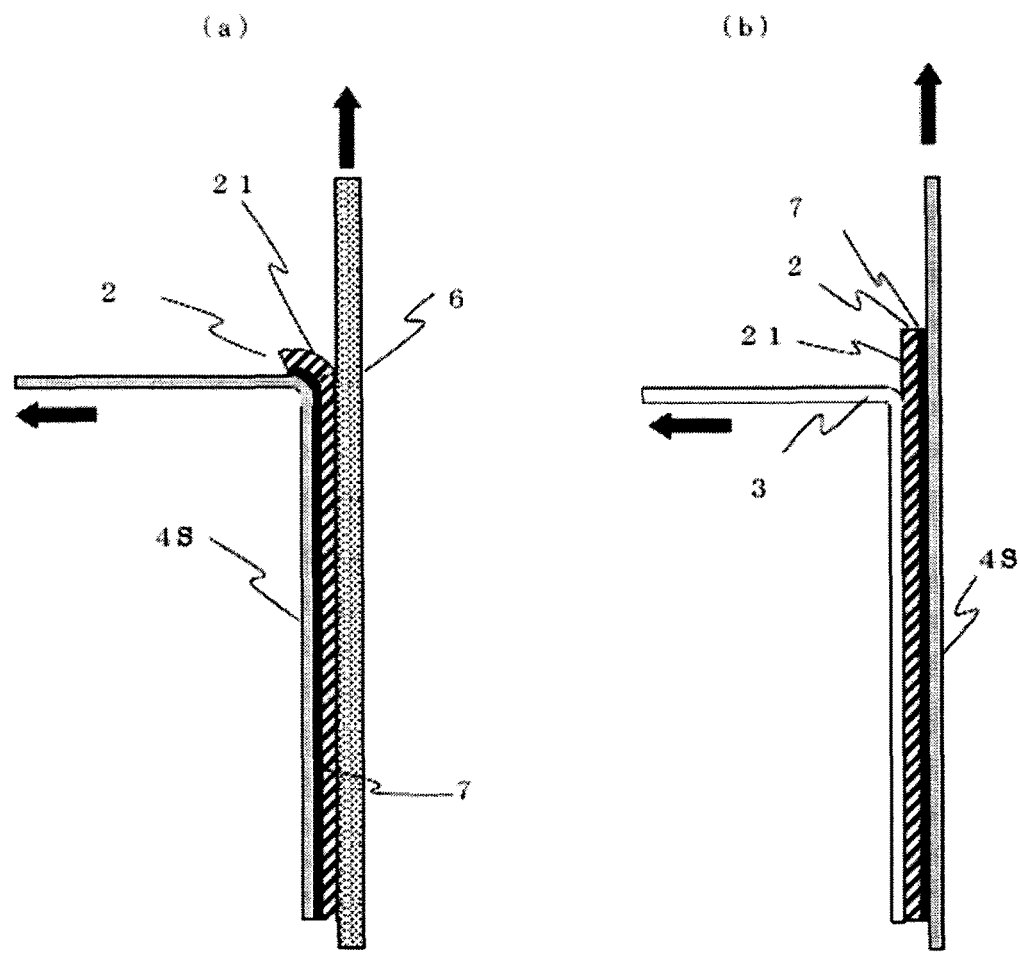
FIG. 9 is a schematic drawing explaining a configuration and a test aspect of a sample of a peel strength test.

Test samples for evaluation of peel strength were prepared in configurations schematically shown in FIGS. 9 (a) and (b), in the case where the adherend was laminated onto a surface activation treated surface of the transparent adhesive sheet for optics attached with the release film (B) prepared in each of Examples and Comparative Example, then peeling and removing the release film (B), and laminating a resin film (Emblet, PET, produced by Unichika Co., Ltd.) onto a surface from where the release film (B) was peeled, via a primer (Primer A, produced by Shin-Etsu Chemical Co., Ltd.); as well as in the case where the release film (A) was laminated, respectively, and the test was performed.

As for lamination condition, 2 kg roller was reciprocated once, in a speed of 300 mm/min, and then the samples were stood still at 23° C. for 20 to 40 minutes.

In addition, as the adherend, an acryl plate with a thickness of 1 mm (MR-200, produced by Mitsubishi Rayon Co., Ltd.), and a glass plate (soda glass, produced by Hiraoka Glass Co., Ltd.) were used.

(3) Change of Peel Strength with Time in the Case of Lamination onto the Adherend According to the above (2) evaluation method for peel strength, the test sample for evaluation of peel strength in the case of laminating onto the adherend, in a configuration of FIG. 9 (a), and the test sample for evaluation of peel strength in the case of laminating onto the release film (A), in a configuration of FIG. 9 (b), were each prepared within 20 minutes after surface activation treatment, and after making them stood still for a predetermined period of time, peel strength was measured. It should be noted that initial value 0 hr, as a base of passing time after lamination, was set at 20 minutes after surface activation treatment (including lamination work onto the adherend), and peel strength at a elapsed time after lamination, shown in Table 3, was measured, respectively.

(4) Change of Peel Strength with Time in the Case where the Surface Activation Treated Surface was Covered with the Release Film (A) and Stored (Verification of Activity Maintaining Effect by the Activity Maintaining Layer)

The test sample for evaluation of peel strength, where the adherend and the surface activation treated surface were laminated, in a configuration of FIG. 9(a), was prepared, by peeling and removing the release film (A), when predetermined time (storage elapsed time) has come from start of storage, after storage at room temperature (25° C.), of the laminated body of transparent adhesive sheet for optics, where the release film (A) was laminated onto the surface activation treated surface of the transparent adhesive sheet for optics attached with the release film (B) prepared in each of Examples and Comparative Example, to measure peel strength between the surface activation treated surface of the transparent adhesive sheet for optics and the adherend, by the above (2) test method for peel strength. It should be noted that initial value 0 hr, as a base of passing time for storage, was set at 20 minutes after surface activation treatment, and peel strength at a elapsed time for storage, shown in Table 4, was measured, respectively.

TABLE 1

| | Lamp type | Wavelength λ [nm] | Integrated light quantity [mJ/cm²] | Peel strength [N/20 mm] | | |
|---|---|---|---|---|---|---|
| | | | | Glass | PMMA | release film A |
| Example 1 | Excimer (Xe) | 172 | 0.01 | 2.7 | 3.3 | 0.2 |
| Example 2 | | | 0.03 | 3.3 | 5.0 | 0.2 |
| Example 3 | | | 0.18 | 4.4 | 7.0 | 0.2 |
| Example 4 | | | 0.36 | 4.8 | 7.0 | 0.2 |
| Example 5 | | | 1.00 | 6.0 | 7.2 | 0.2 |
| Example 6 | | | 3.36 | 8.6 | 8.1 | 0.1 |
| Example 7 | | | 6.17 | 9.0 | 8.7 | 0.1 |
| Example 8 | | | 12.33 | 9.2 | 8.4 | 0.1 |
| Example 9 | | | 24.80 | 6.2 | 5.3 | 0.1 |
| Example 10 | | | 27.50 | 5.9 | 4.1 | 0.1 |
| Example 11 | | | 37.00 | 4.9 | 3.3 | 0.1 |
| Example 12 | | | 44.20 | 4.1 | 2.3 | 0.1 |
| Example 13 | | | 55.50 | 3.1 | 1.3 | 0.1 |
| Example 14 | | | 62.00 | 2.9 | 1.0 | 0.1 |

TABLE 2

| | Lamp type | Wavelength λ [nm] | Integrated light quantity [mJ/cm²] | Peel strength [N/20 mm] | | |
|---|---|---|---|---|---|---|
| | | | | Glass | PMMA | release film A |
| Example 15 | Excimer (KrCl) | 222 | 5.0 | 3.1 | 4.1 | 0.3 |
| Example 16 | | | 10.0 | 3.1 | 4.2 | 0.3 |
| Example 17 | | | 18.5 | 3.1 | 4.1 | 0.3 |
| Example 18 | | | 25.4 | 3.2 | 3.9 | 0.3 |
| Example 19 | | | 50.8 | 3.5 | 3.9 | 0.3 |
| Example 20 | | | 63.4 | 3.1 | 3.9 | 0.3 |
| Example 21 | | | 101.5 | 3.1 | 3.8 | 0.3 |
| Example 22 | Excimer (XeCl) | 308 | 5.0 | 3.0 | 4.0 | 0.3 |
| Example 23 | | | 19.8 | 3.2 | 3.9 | 0.3 |
| Example 24 | | | 60.5 | 3.1 | 4.1 | 0.3 |
| Example 25 | | | 100.5 | 3.2 | 4.0 | 0.3 |
| Example 26 | Excimer (Ar) | 126 | 0.01 | 9.2 | 9.0 | 0.1 |
| Example 27 | | | 0.33 | 6.1 | 7.0 | 0.1 |
| Example 28 | | | 1.00 | 4.0 | 4.2 | 0.1 |
| Example 29 | Metal halide | 250 to 460 | 10.0 | 3.7 | 4.2 | 0.2 |
| Example 30 | | | 30.0 | 3.2 | 3.6 | 0.2 |
| Example 31 | | | 105.0 | 3.1 | 3.5 | 0.2 |
| Comparative Example. 1 | — | — | — | 2.3 | 2.9 | 0.3 |

TABLE 3

| | Lamination object | Elapsed time [hr] | [N/20 mm] | | | | |
|---|---|---|---|---|---|---|---|
| | | | 0 | 24 | 120 | 504 | 1008 |
| Example 7 | PMMA | Peel strength | 8.7 | 15.0 | 15.0 | 13.7 | 15.0 |
| | | Increased amount | 0.0 | 6.3 | 6.3 | 5.0 | 6.3 |
| | glass | Peel strength | 9.0 | 14.3 | 15.0 | 15.0 | 15.0 |
| | | Increased amount | 0.0 | 5.3 | 6.0 | 6.0 | 6.0 |
| | Release film | Peel strength | 0.1 | 0.1 | 0.2 | 0.2 | — |
| | | Increased amount | 0.0 | 0.0 | 0.1 | 0.1 | — |
| Example 10 | PMMA | Peel strength | 4.1 | 7.2 | 7.7 | 7.5 | 8.2 |
| | | Increased amount | 0.0 | 3.1 | 3.6 | 3.4 | 4.1 |

TABLE 3-continued

| | | | [N/20 mm] | | | | |
|---|---|---|---|---|---|---|---|
| Lamination object | Elapsed time [hr] | | 0 | 24 | 120 | 504 | 1008 |
| | glass | Peel strength | 6.0 | 10.9 | 15.0 | 15.0 | 15.0 |
| | | Increased amount | 0.0 | 4.9 | 9.0 | 9.0 | 9.0 |
| | Release film | Peel strength | 0.1 | 0.1 | 0.1 | 0.3 | — |
| | | Increased amount | 0.0 | 0.0 | 0.0 | 0.2 | — |
| Example 12 | PMMA | Peel strength | 2.3 | 4.1 | 4.7 | 4.8 | 5.1 |
| | | Increased amount | 0.0 | 1.8 | 2.4 | 2.5 | 2.8 |
| | glass | Peel strength | 4.1 | 7.4 | 10.5 | 15.0 | 15.0 |
| | | Increased amount | 0.0 | 3.3 | 6.4 | 10.9 | 10.9 |
| | Release film | Peel strength | 0.1 | 0.1 | 0.1 | 0.2 | — |
| | | Increased amount | 0.0 | 0.0 | 0.0 | 0.1 | — |
| Comparative Example 1 | PMMA | Peel strength | 2.9 | 3.5 | 3.7 | 3.9 | 4.3 |
| | | Increased amount | 0.0 | 0.6 | 0.8 | 1.0 | 1.4 |
| | glass | Peel strength | 2.3 | 4.9 | 6.6 | 7.5 | 10.7 |
| | | Increased amount | 0.0 | 2.6 | 4.3 | 5.2 | 8.4 |
| | Release film | Peel strength | 0.2 | 0.2 | 0.3 | 0.2 | 0.3 |
| | | Increased amount | 0.0 | 0.0 | 0.1 | 0.0 | 0.1 |

Note:
Underlined bold-faced-types show material failure in peeling.

TABLE 4

| | | | [N/20 mm] | | | | |
|---|---|---|---|---|---|---|---|
| Lamination object | Elapsed time [hr] | | 0 | 24 | 120 | 504 | 1008 |
| Example 7 | PMMA | Peel strength | 8.7 | 8.6 | 7.7 | 7.7 | 7.9 |
| | | Increased amount | 0.0 | −0.1 | −1.0 | −1.0 | −0.8 |
| | glass | Peel strength | 9.0 | 9.9 | 9.1 | 9.3 | 9.1 |
| | | Increased amount | 0.0 | 0.9 | 0.1 | 0.3 | 0.1 |
| Example 10 | PMMA | Peel strength | 4.3 | 4.1 | 3.2 | 3.1 | 4.0 |
| | | Increased amount | 0.0 | −0.2 | −1.1 | −1.2 | −0.3 |
| | glass | Peel strength | 6.0 | 6.0 | 4.3 | 3.8 | 5.6 |
| | | Increased amount | 0.0 | 0.0 | −1.7 | −2.2 | −0.4 |
| Example 12 | PMMA | Peel strength | 2.5 | 2.3 | 1.4 | 1.2 | 1.5 |
| | | Increased amount | 0.0 | −0.2 | −1.1 | −1.3 | −1.0 |
| | glass | Peel strength | 4.5 | 4.1 | 3.1 | 2.3 | 2.5 |
| | | Increased amount | 0.0 | −0.4 | −1.4 | −2.2 | −2.0 |
| Comparative Example 1 | PMMA | Peel strength | 2.9 | 2.8 | 2.8 | 3.0 | — |
| | | Increased amount | 0.0 | −0.1 | −0.1 | 0.1 | — |
| | glass | Peel strength | 2.3 | 2.4 | 2.4 | 2.3 | — |

TABLE 4-continued

| | | | [N/20 mm] | | | | |
|---|---|---|---|---|---|---|---|
| Lamination object | Elapsed time [hr] | | 0 | 24 | 120 | 504 | 1008 |
| | | Increased amount | 0.0 | 0.1 | 0.1 | 0.0 | — |
| | Release film | Peel strength | 0.2 | 0.2 | 0.2 | 0.2 | — |
| | | Increased amount | 0.0 | 0.0 | 0.0 | 0.0 | — |

As shown in Table 1 and Table 2, and as is apparent from comparison between Examples 1 to 31 and Comparative Example 1, it is understood that by performing surface activation treatment using UV-ray irradiation, peel strength is enhanced in any Examples. In particular, in xenon excimer (172 nm) of Examples 1 to 14 and argon excimer (126 nm) of Examples 26 to 28, enhancement of peel strength was superior in a range of specific integrated light quantity.

Figure 5:
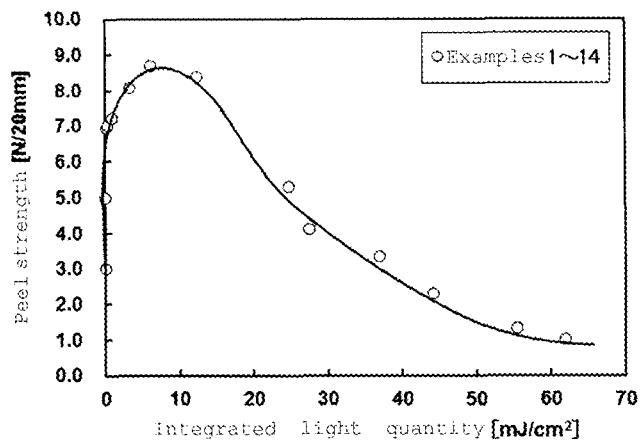
FIG. 5 is a graph showing relationship between peel strength and irradiation integrated light quantity in Example of the production method of the transparent adhesive sheet for optics of the present invention.
Figure 5:
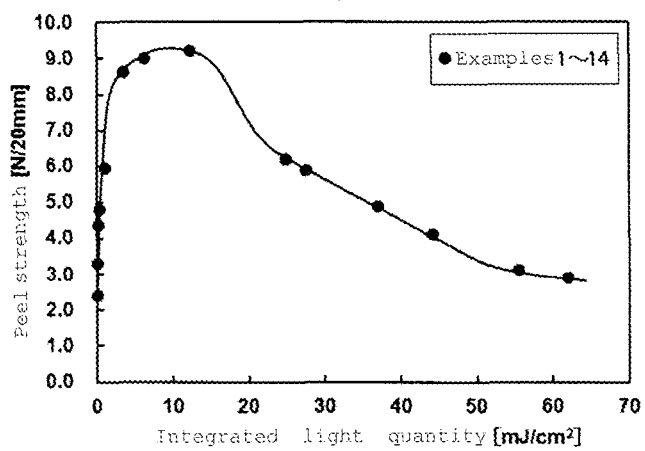
Figure 5:
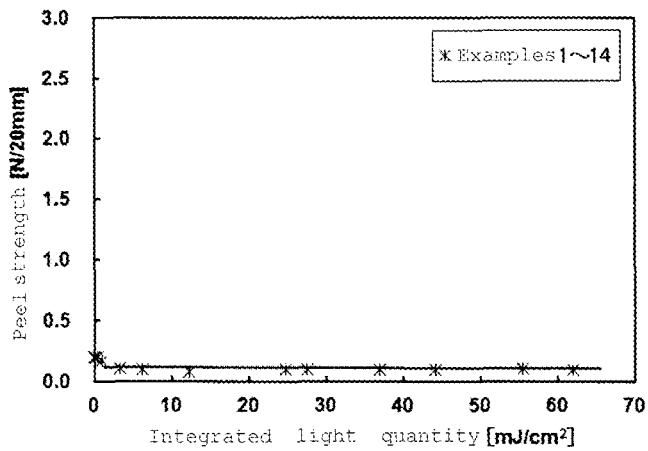

As for dependence of this peel strength on integrated light quantity, in observing in detail, in the case of xenon excimer (172 nm), as shown in FIG. 5 where dependence of peel strength after treatment on integrated light quantity was plotted based on results of Table 1, it is understood that in any of the case where a substrate is PMMA (FIG. 5 (a) and glass (FIG. 5 (b)), peel strength enhanced at the integrated light quantity of 0.01 mJ/cm$^2$ or higher, as compared with a non-treated product, and showed peak value of peel strength at around 10 mJ/cm$^2$, and on the contrary, the higher integrated light quantity makes enhancement effect of peel strength the less, and too high integrated light quantity decreases peel strength as compared with the non-treated product (in an example of PMMA, over 35 mJ/cm$^2$).

As a result, it is understood that it is preferable to set the integrated light quantity at 30 mJ/cm$^2$ or lower, and particularly preferable in a range of 10±5 mJ/cm$^2$, because enhancement effect of peel strength of 30% or more in the case of an acryl substrate, and 10% or more of the peak, in the case of a glass substrate, can be secured, as compared with a non-treated product.

Still more, it is understood, from FIG. 5 (c), that as for dependence of peel strength with the release film (A), after excimer UV treatment, on the integrated light quantity, light peeling property nearly equivalent to the case of non-treating, can be realized, irrespective of the integrated light quantity. Accordingly, because only adhesion in the time of lamination with the adherend can be enhanced without changing peeling property of the release film, adhesion can be adjusted easily by presence or absence of excimer UV treatment.

It should be noted that it is understood that, in the case of argon excimer (126 nm), peel strength is significantly enhanced, under condition of an integrated light quantity of less than 1 mL/cm$^2$, from the results of Examples 26 to 28 shown in Table 2.

Figure 6:
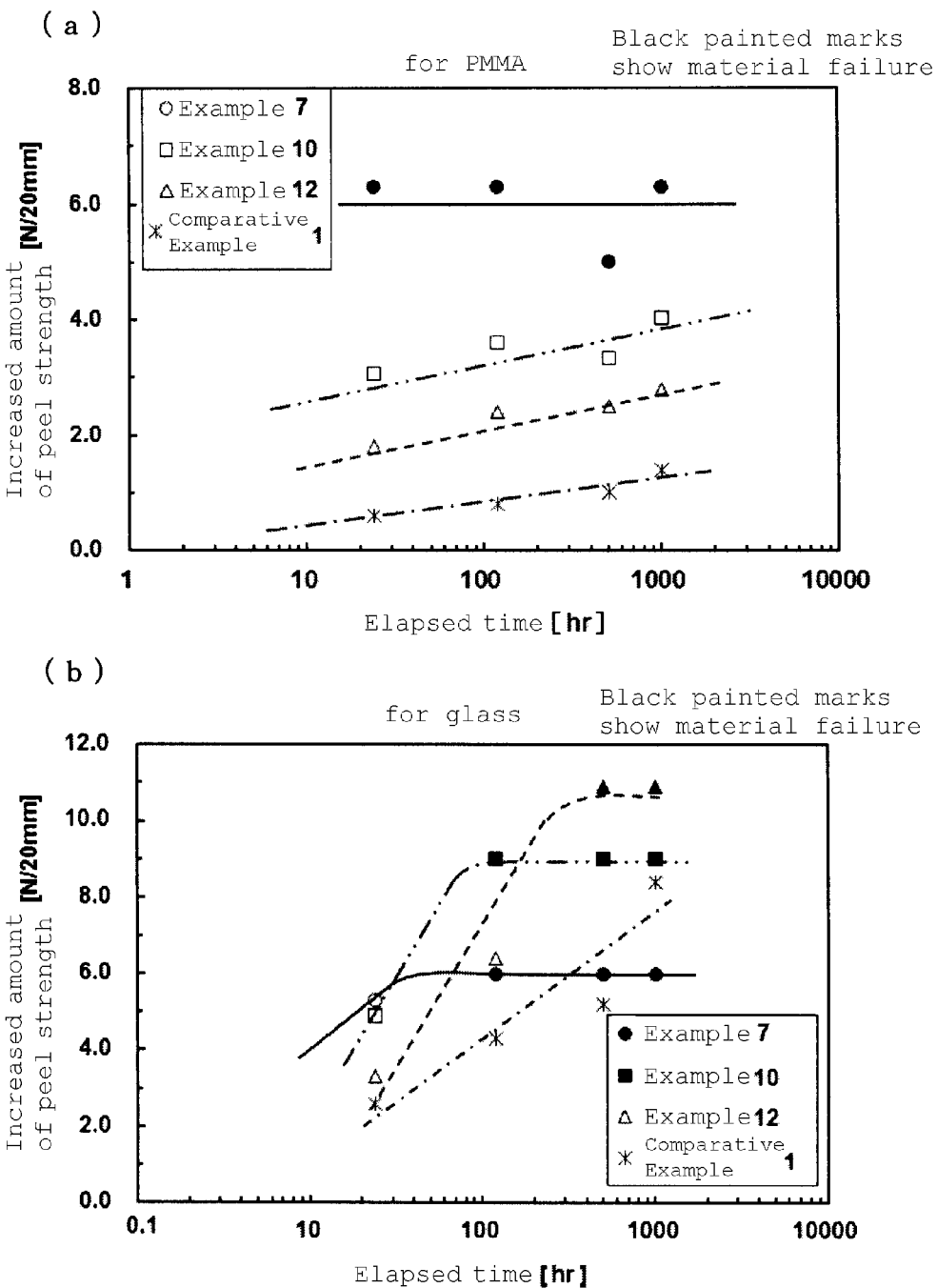
FIG. 6 is a graph showing change of increased amount of peel strength with time after laminating onto the adherend in Example of the production method of the transparent adhesive sheet for optics of the present invention.
Figure 7:
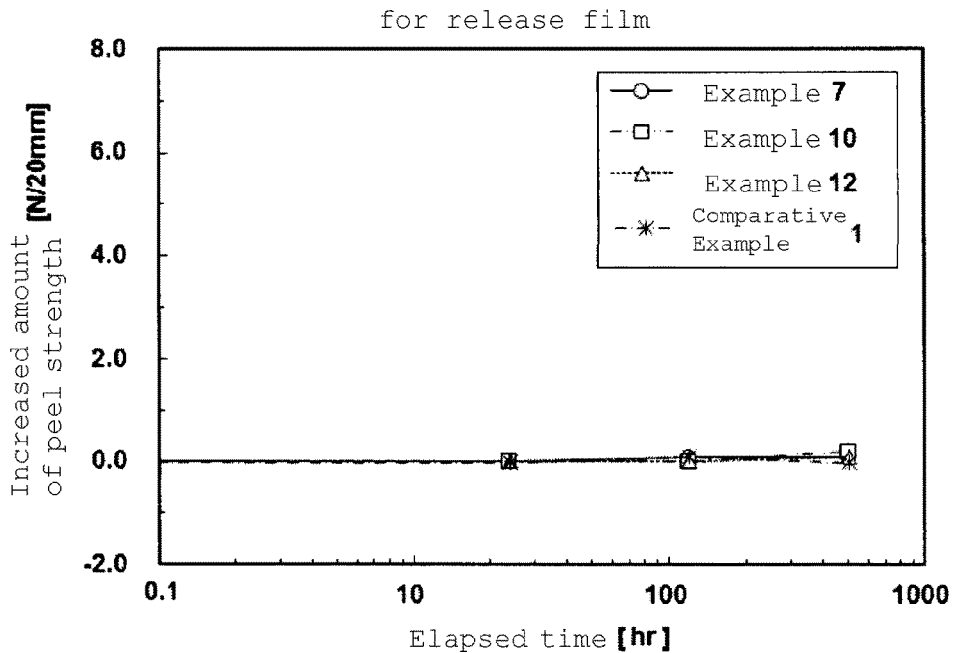
FIG. 7 is a graph showing change of increased amount of peel strength with time, in the case of covering with a surface activity maintaining layer, in Example of the production method of the transparent adhesive sheet for optics of the present invention.

In addition, as for adhesion with time after lamination, which is characteristics of the present invention, comparative evaluation results between the transparent adhesive sheet for optics of Examples 7, 10 and 12, and the transparent adhesive sheet for optics of Comparative Example 1 are shown in Table 3, and still more, as for the case of laminating onto a PMMA plate, a glass plate, and a release film (the activity maintaining layer), relation between increased amount (difference) of peel strength relative to peel strength in initial lamination, and a period of elapsed time after lamination, in Table 3, is shown in FIG. 6(a), FIG. 6(b), and FIG. 7, respectively. It should be noted that, black-painted plots in FIGS. 6(a) and (b), as well as, underlined bold-faced inscriptions in Table 3 show material failure of the transparent adhesive sheet for optics.

From the result of FIG. 6(a), it is understood that, as compared with the case of PMMA as the adherend, where adhesion increases mildly with time in Comparative Example 1 without surface activation treatment, in the transparent adhesive sheet for optics of Examples 7, 10 and 12, the smaller integrated light quantity of UV-ray irradiation provides the larger degree of increase in adhesion with the adherend, with time, and in particular, in Example 7, where the integrated light quantity is 20 mJ/cm$^2$ or less, adhesion increases to a level of material failure, in a short period of time.

In addition, it is understood that, in the case of the transparent adhesive sheet for optics, using a glass plate as the adherend, as shown in FIG. 6(b), adhesion of the transparent adhesive sheet for optics of Examples 7, 10 and 12 is promoted with time, where excimer UV treatment was performed, and the smaller integrated light quantity provides the shorter time to reach a level of material failure, in peeling, as compared with the transparent adhesive sheet for optics of Comparative Example 1 without surface activation treatment.

Still more, although not described in FIG. 6(a), FIG. 6(b), and Table 3, all of the transparent adhesive sheet for optics of Examples 7, 10 and 12 can be peeled from PMMA and glass, which are subjects to be adhered, as long as within such a elapsed time after lamination, as not cause material failure of the transparent adhesive sheet for optics, in peeling from subjects to be adhered.

In this way, although there is difference in behavior of adhesion with time, depending on kind of the adherend or surface activation treatment condition by UV-ray irradiation, it is understood that adhesion with time is promoted by any surface activation treatment, as well as rework is possible in a range of a elapsed time after lamination, which enables peeling after lamination. Still more, it is understood that by adjustment of surface activation treatment condition, adhesion with time can be adjusted, in response to kind of the adherend or desired rework time.

In addition, from the result of FIG. 7, it is understood that, in the case where the release film (A) was laminated, change of peel strength with time after lamination is little, which is equivalent to the level of the transparent adhesive sheet for optics of Comparative Example 1 without surface activation treatment, irrespective of integrated light quantity of excimer UV treatment, and because also in a storage state before lamination onto optical components, removal easiness of the release film does not change, and thus stable peeling property of the release film is maintained, storage property before lamination onto optical components is superior.

Figure 8:
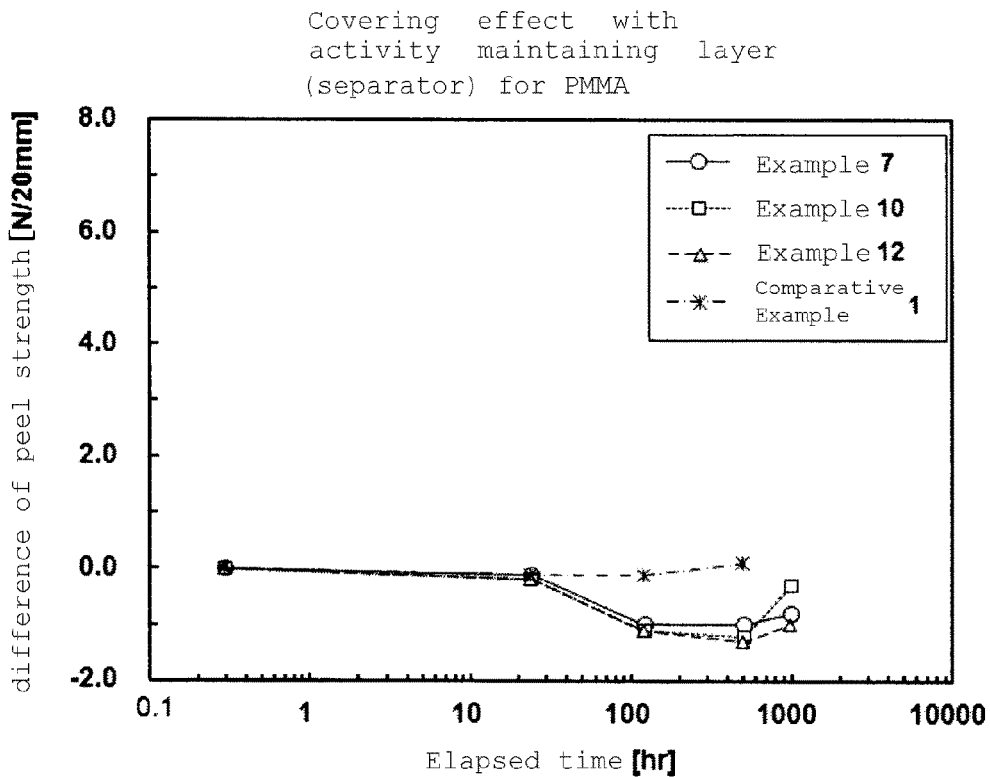
FIG. 8 is a graph showing relation between storage period and peel strength with the adherend (PMMA) after storage, in a state of covering with a surface activity maintaining layer, in Example of the production method of the transparent adhesive sheet for optics of the present invention.

Still more, based on result of Table 4, relation between a period of time for storing, in a covered state with the activity maintaining layer, and peel strength in laminating the release film (A) onto the adherend (PMMA), by peeling and removing the release film (A), was shown in FIG. 8, as for the laminated body of the transparent adhesive sheet for optics stored by covering the surface activation treated surface with the release film (A), as the activity maintaining layer. It should be noted that increased amount in Table 4 is value obtained by subtracting peel strength at elapsed time in storage of 0 hr from peel strength in each elapsed time in storage.

From these results, it is understood that peel strength with the adherend is little changed as within 1 N/20 mm, even after 1000 hrs have passed, relative to time for storing in a covered state with the activity maintaining layer, and by covering (laminating) with the activity maintaining layer, effect of surface activation treatment is maintained.

Still more, although not described in Tables 1 to 4, in Example 7, when contact angle before and after surface treatment by UV-ray irradiation was measured, contact angle before surface activation treatment (equivalent to Comparative Example 1) was 124 degree, while contact angle after surface activation treatment was 123 degree, that is difference thereof was extremely small, and thus it is suggested that action effect of the present invention is the one based on mechanism different from a conventional one, because tackiness is enhanced by surface activation treatment, and effect thereof is maintained over a long period of time, irrespective of extremely small degree of hydrophilization by surface activation treatment.

INDUSTRIAL APPLICABILITY

The transparent adhesive sheet for optics obtained by the production method of the transparent adhesive sheet for optics of the present invention can be used in a display apparatus such as a mobile phone, a liquid crystal monitor, a liquid crystal TV, sign or advertisement indoors or outdoors, an illuminated sign for notice or the like, a lighting equipment, optical components for a vehicle such as a tale lamp, car interior lighting, or the like, because of satisfaction of both adhesion and rework property. In addition, it can be applied also to a non-transparent silicone-based adhesive sheet, and can be used in wider applications without being limited to optical applications.

REFERENCE SIGNS LIST 1, 10, 100, 101 laminated body of transparent adhesive sheet for optics
  2 optical transparent adhesive body
  21 surface activated surface
  3 release film (A)
  4 release film (B)
  4S resin film
  5 uncured raw material of transparent adhesive body for optics
  6 adherend
  7 primer
  75 winding core
  80 heating apparatus (heater)
  81 doctor blade (squeegee plate)
  82 raw material supply apparatus
  83 cooling apparatus
  84, 841, 842, 843, 844, 845 conveying apparatus (conveyor)
  85 calender roll
  86 sheet cutting apparatus
  87 release film (A) lamination apparatus
  91 release film (B) supply apparatus (roll)
  92 release film (A) supply apparatus (roll)
  93 release film (A) peeling and recovering apparatus (roll)
  94 supply apparatus (roll) for release film (A) lamination
  95 surface activation treatment apparatus (UV-ray treatment apparatus/excimer UV treatment apparatus)

The invention claimed is:

1. A method for producing a silicone-based transparent adhesive sheet for optics for assembling optical components, the method comprising:

performing a UV-ray irradiation treatment by irradiating UV-ray on at least a part of a cured and fully hardened heat-curing-type silicone-based adhesive surface to contact with the adherend of said transparent adhesive sheet for optics, thereby forming a surface activation treated surface, wherein peel strength after laminating onto an adherend increases with time, as compared with peel strength before lamination.

2. The method for producing a silicone-based transparent adhesive sheet for optics according to claim 1, wherein wavelength of said UV-ray irradiation treatment is 365 nm or less, and irradiation integrated light quantity is 30 mJ/cm$^2$ or less.

3. The method for producing a silicone-based transparent adhesive sheet for optics according to claim 1, wherein said UV-ray irradiation treatment is an excimer UV-ray irradiation treatment.

4. The method for producing a silicone-based transparent adhesive sheet for optics according to claim 1, wherein as for peel strength (B) after 24 hours of lamination onto said adherend, increased amount (B−A) of peel strength is 1 N/20 mm or more, relative to peel strength (A) of initial lamination, in a 90 degree peeling mode of an adhesion force test in accordance with JIS Z0237.

5. The method for producing a silicone-based transparent adhesive sheet for optics according to claim 1, wherein an activity maintaining layer is still more laminated on the surface activation treated surface.

6. The method for producing a silicone-based transparent adhesive sheet for optics according to claim 5, wherein the activity maintaining layer is a release film having a peel treatment layer selected from an alkyd resin-based, an aliphatic amide-based, a fluoro-silane-based, or a fluoro-silicone-based.

7. A transparent adhesive sheet for optics obtained from the production method according to claim 1.

8. A method for producing a laminated body, the method comprising laminating an adherend composed of optical components selected from a protection panel, a polarizing plate, a retardation film, a diffusion film or a liquid crystal display apparatus, on the surface activation treated surface of the transparent adhesive sheet for optics obtained from the production method of the transparent adhesive sheet for optics according to claim 1.

9. A laminated body obtained from the production method according to claim 8.

10. Optical components obtained by using the transparent adhesive sheet for optics or the laminated body according to claim 8.

* * * * *